United States Patent
Siddiqui et al.

(10) Patent No.: US 10,410,261 B2
(45) Date of Patent: Sep. 10, 2019

(54) SYSTEMS AND METHODS FOR DETERMINING FACET RANKINGS FOR A WEBSITE

(71) Applicant: WAL-MART STORES, INC., Bentonville, AR (US)

(72) Inventors: Omar Saeed Siddiqui, Sunnyvale, CA (US); Abilash Amarthaluri, San Jose, CA (US); George Roumeliotis, Menlo Park, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 265 days.

(21) Appl. No.: 15/605,665

(22) Filed: May 25, 2017

(65) Prior Publication Data

US 2018/0341997 A1    Nov. 29, 2018

(51) Int. Cl.
*G06Q 30/06* (2012.01)
*G06F 16/957* (2019.01)
(Continued)

(52) U.S. Cl.
CPC ..... *G06Q 30/0601* (2013.01); *G06F 16/9535* (2019.01); *G06F 16/9577* (2019.01); *G06F 16/972* (2019.01); *G06Q 30/0201* (2013.01)

(58) Field of Classification Search
CPC combination set(s) only.
See application file for complete search history.

(56) References Cited

U.S. PATENT DOCUMENTS

| 7,698,261 B1 * | 4/2010 | Khoshnevisan | G06F 16/35 707/999.003 |
| 8,024,324 B2 * | 9/2011 | Amitay | G06F 16/334 707/715 |

(Continued)

FOREIGN PATENT DOCUMENTS

| EP | 2560104 A2 * | 8/2013 | G06F 17/27 |
| EP | 3091445 A1 * | 9/2016 | G06F 17/27 |

OTHER PUBLICATIONS

Kim, Hak-Jin et al., Dynamic faceted navigation in decision making using Semantic Web technology Decision Support Systems, vol. 61, 2014 (Year: 2014).*

(Continued)

*Primary Examiner* — Scott L Jarrett
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of displaying a plurality of facets of a product type on a website of an online retailer in a plurality of facet orders, determining a first individual number of times a facet was selected when in a first position, determining a second individual number of times the facet was selected when in a second position, estimating a first estimated number of times the facet would have been selected if the facet had been in the first position rather than the second position, determining a ranking of the plurality of facets, and coordinating displaying at least a portion of the plurality of facets on the website of the online retailer in an order of the ranking.

20 Claims, 5 Drawing Sheets

(51) Int. Cl.
*G06F 16/954* (2019.01)
*G06Q 30/02* (2012.01)
*G06F 16/958* (2019.01)
*G06F 16/9535* (2019.01)

(56) References Cited

U.S. PATENT DOCUMENTS

| | | | | |
|---|---|---|---|---|
| 8,051,080 B2* | 11/2011 | Kraft | G06F 16/951 | 707/736 |
| 8,065,301 B2* | 11/2011 | Ginsburg | G06F 16/951 | 707/736 |
| 8,108,439 B2* | 1/2012 | Guo | G06F 16/954 | 707/802 |
| 8,135,708 B2* | 3/2012 | Morton | G06F 16/951 | 707/728 |
| 8,161,044 B2* | 4/2012 | Blackwell | G06F 16/951 | 707/731 |
| 8,219,453 B1 | 7/2012 | Iida et al. | | |
| 8,433,705 B1* | 4/2013 | Dredze | G06F 16/3322 | 707/723 |
| 8,452,785 B1 | 5/2013 | Iida et al. | | |
| 8,510,349 B1* | 8/2013 | Puttick | G06F 16/24542 | 707/805 |
| 9,251,279 B2* | 2/2016 | Mihalik | G06F 3/0482 | |
| 9,311,413 B1* | 4/2016 | Franklin | G06F 16/24578 | |
| 9,613,372 B2* | 4/2017 | Pathak | G06F 16/245 | |
| 10,114,896 B2* | 10/2018 | Junginger | G06F 16/9535 | |
| 10,242,103 B2* | 3/2019 | Bivens | G06F 3/0482 | |
| 2004/0044661 A1* | 3/2004 | Allen | G06F 16/951 | |
| 2004/0210491 A1 | 10/2004 | Sadri | | |
| 2006/0095281 A1* | 5/2006 | Chickering | G06Q 30/02 | 705/37 |
| 2006/0294071 A1* | 12/2006 | Weare | G06F 16/951 | |
| 2007/0255745 A1* | 11/2007 | Gargi | G06F 16/58 | |
| 2007/0282769 A1* | 12/2007 | Biemer | G06F 16/38 | 706/20 |
| 2008/0010276 A1* | 1/2008 | Morton | G06F 16/334 | |
| 2009/0037402 A1* | 2/2009 | Jones | G06F 16/951 | |
| 2011/0252013 A1* | 10/2011 | Lempel | G06F 16/338 | 707/706 |
| 2011/0320442 A1* | 12/2011 | Faruquie | G06F 16/958 | 707/723 |
| 2012/0030152 A1* | 2/2012 | Pueyo | G06Q 30/00 | 706/12 |
| 2012/0173521 A1* | 7/2012 | Lam | G06F 16/3326 | 707/734 |
| 2012/0226681 A1* | 9/2012 | Paparizos | G06F 16/24578 | 707/723 |
| 2012/0310940 A1* | 12/2012 | Carmel | G06F 16/38 | 707/740 |
| 2014/0201647 A1* | 7/2014 | Scherpa | G06F 3/048 | 715/747 |
| 2014/0258277 A1* | 9/2014 | Cheng | G06F 16/245 | 707/723 |
| 2014/0279202 A1* | 9/2014 | Egozi | G06Q 10/10 | 705/26.7 |
| 2014/0324825 A1* | 10/2014 | Gopinath | G06F 16/24575 | 707/722 |
| 2015/0154264 A1* | 6/2015 | Lightner | G06F 16/2228 | 707/780 |
| 2016/0026643 A1* | 1/2016 | Desai | G06Q 10/10 | 707/727 |
| 2016/0267086 A1* | 9/2016 | Liden | G06F 16/285 | |
| 2017/0221120 A1* | 8/2017 | Pathak | G06Q 30/0625 | |
| 2018/0189417 A1* | 7/2018 | Freed | G06N 20/00 | |
| 2018/0232450 A1* | 8/2018 | Bivens | G06F 3/0482 | |

OTHER PUBLICATIONS

Vandic, Damir et al., Dynamic Facet Ordering for Faceted Product Search IEEE Transactions on Knowledge and Data Engineering, vol. 29, No. 5, May 2017 (Year: 2017).*

Sacco et al., Dynamic Taxonomies and Faceted Search—Chapter 4—User Interface Design The Information Retrieval Series, vol. 25, 2009 (Year: 2009).*

Kong, Weize, Extending Faceted Search to the Open-Domain Web University of Massachusetts, Dissertation, 2016 (Year: 2016).*

Tunkelang, Daniel, Faceted Search Morgan & Claypool, Synthesis Lectures on Information Concepts, Retrieval and Services #5, 2009 (Year: 2009).*

Vandic, Damir et al., Facet Selection Algorithms for Web Product Search ACM, CIKM'13, 2013 (Year: 2013).*

Koren, Jonathan et al., Personalized Interactive Faceted Search ACM, WWW2008, Apr. 2008 (Year: 2008).*

Cao, Huanhuan et al., Context-Aware Query Suggestion by Mining Click-Through and Session Data ACM, KDD'08, Aug. 2008 (Year: 2008).*

Wei, Bifan et al., A Survey of Faceted Search Journal of Web Engineering, vol. 12, No. 1, 2013 (Year: 2013).*

* cited by examiner

SYSTEMS AND METHODS FOR
DETERMINING FACET RANKINGS FOR A
WEBSITE

TECHNICAL FIELD

This disclosure relates generally to determining facet rankings for facets corresponding to product attributes on a website of an online retailer.

BACKGROUND

Facets for product attributes of product types are often displayed on websites for online retailers. Facets for the product attributes can be used in faceted navigation or faceted browsing to allow users to explore product types by applying one or more filters. The number of times a particular facet is selected on a website of an online retailer is often used to determine the importance of a corresponding product attribute for a customer. Selection of a particular facet, however, can be highly dependent upon placement of the particular facet on the webpage. For example, facets appearing higher in a list of facets are typically selected more frequently than facets appearing lower in the list of facets. As such, placement of a facet corresponding to a less important product attribute at the top of a list of facets can result in an erroneous conclusion that the product attribute is important to customers.

BRIEF DESCRIPTION OF THE DRAWINGS

To facilitate further description of the embodiments, the following drawings are provided in which.

Figure 1:
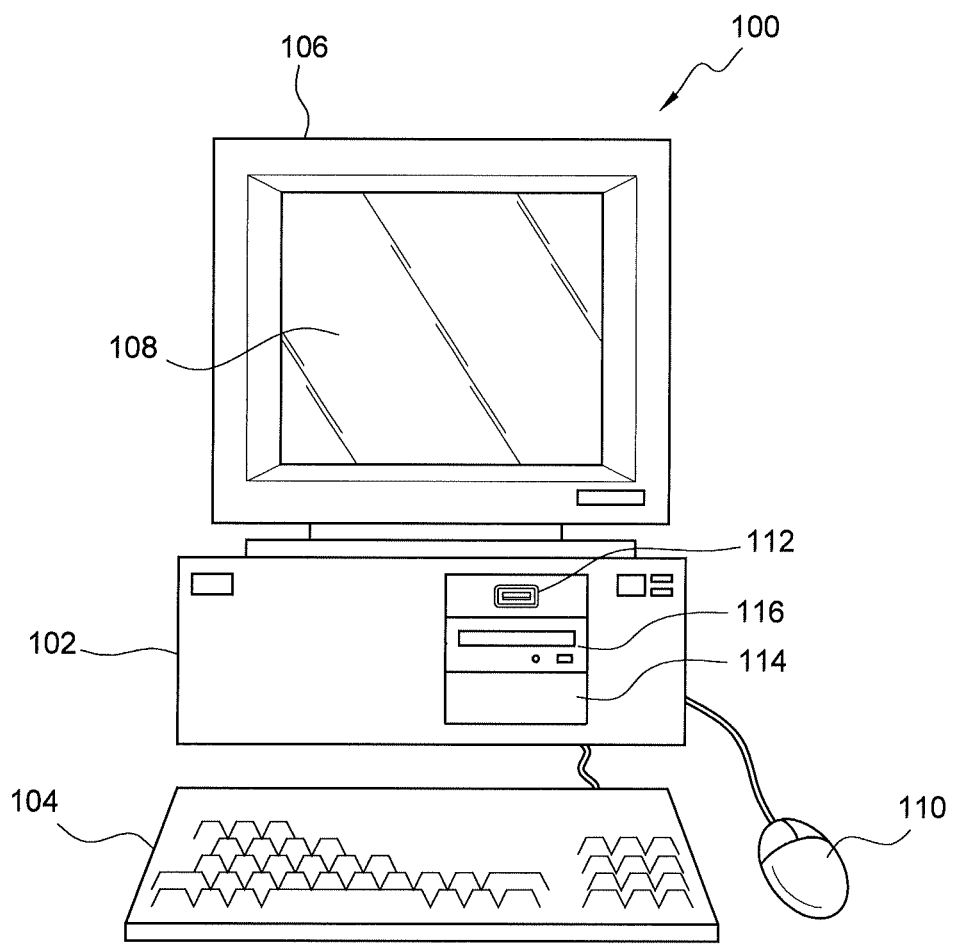
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of coordinating displaying a plurality of facets of a product type on a web site of an online retailer in a plurality of facet orders. Each facet of the plurality of facets can comprise a product attribute of a plurality of product attributes for the product type. The one or more storage modules also can be configured to run on the one or more processing modules and perform an act of, for each facet of the plurality of facets, determining a first individual number of times the facet was selected when in a first position in the plurality of facet orders. The one or more storage modules also can be configured to run on the one or more processing modules and perform an act of, for each facet of the plurality of facets, determining a second individual number of times the facet was selected when in a second position in the plurality of facet orders different from the first position. The one or more storage modules also can be configured to run on the one or more processing modules and perform an act of, for each facet of the plurality of facets, estimating a first estimated number of times the facet would have been selected if the facet had been in the first position rather than the second position using (1) a first set of rules, and (2) the second individual number of times the facet was selected when in the second position. The one or more storage modules also can be configured to run on the one or more processing modules and perform an act of determining a ranking of the plurality of facets using (1) a second set of rules, (2) the first individual number of times each facet of the plurality of facets was selected when in the first position, and (3) the first estimated number of times each facet of the plurality of facets would have been selected if each facet of the plurality of facets had been in the first position rather than the second position. The one or more storage modules also can be configured to run on the one or more processing modules and perform an act of coordinating displaying at least a portion of the plurality of facets on the website of the online retailer in an order of the ranking of the plurality of facets.

Various embodiments include a method. The method can include coordinating, by an online retailer computer system, displaying a plurality of facets of a product type on a website of an online retailer in a plurality of facet orders. Each facet of the plurality of facets can comprise a product attribute of a plurality of product attributes for the product type. The method also can include, for each facet of the plurality of facets, determining, by the online retailer computer system, a first individual number of times the facet was selected when in a first position in the plurality of facet orders. The method also can include, for each facet of the plurality of facets, determining, by the online retailer computer system, a second individual number of times the facet was selected when in a second position in the plurality of facet orders different from the first position. The method also can include, for each facet of the plurality of facets, estimating, by the online retailer computer system, a first estimated number of times the facet would have been selected if the facet had been in the first position rather than the second position using (1) a first set of rules, and (2) the second individual number of times the facet was selected when in the second position. The method also can include determining, by the online retailer computer system, a ranking of the plurality of facets using (1) a second set of rules, (2) the first individual number of times each facet of the plurality of facets was selected when in the first position, and (3) the first estimated number of times each facet of the plurality of facets would have been selected if each facet of the plurality of facets had been in the first position rather than the second position. The method also can include coordinating, by the online retailer computer system, displaying at least a portion of the plurality of facets on the website of the online retailer in an order of the ranking of the plurality of facets.

Figure 2:
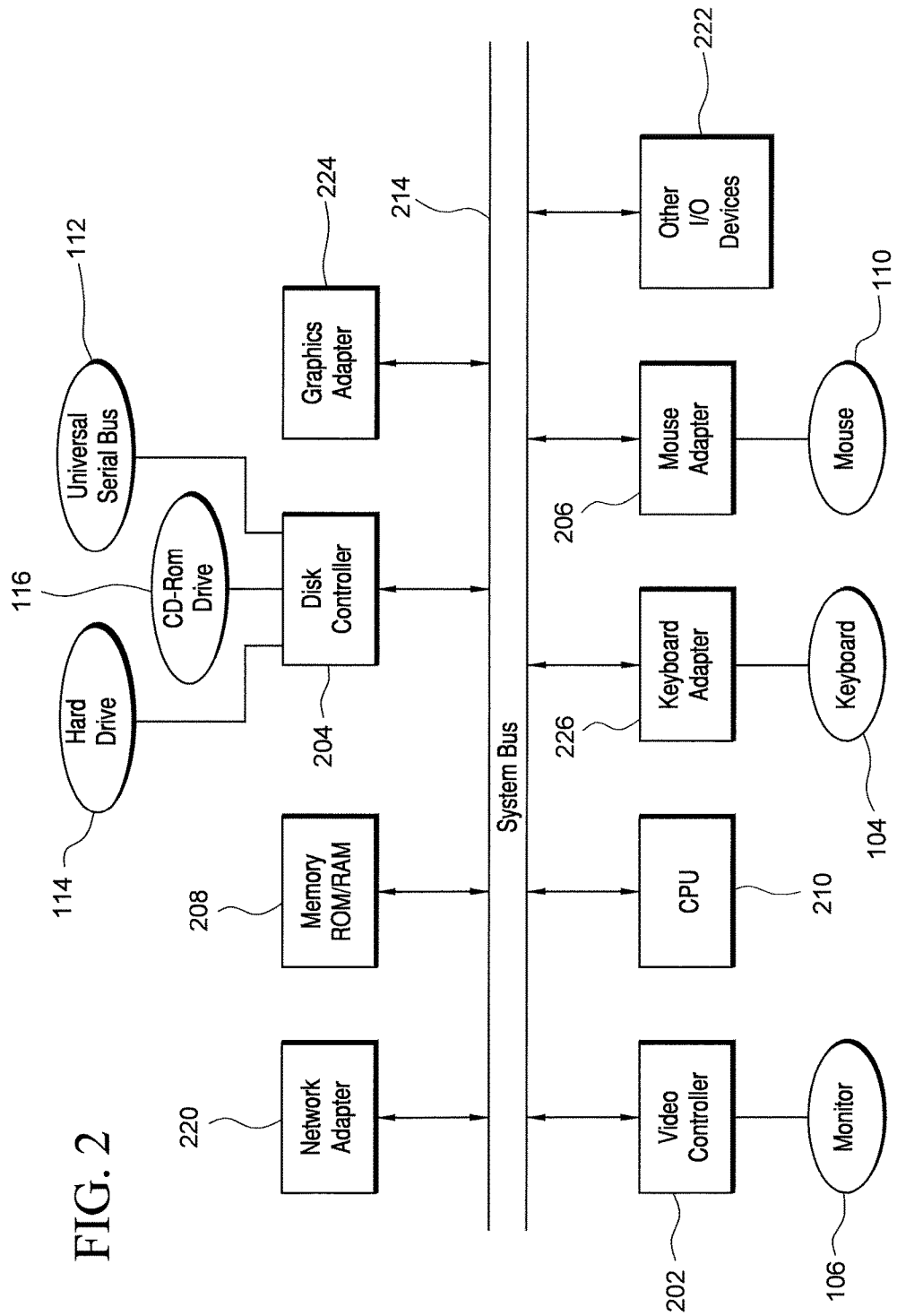
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
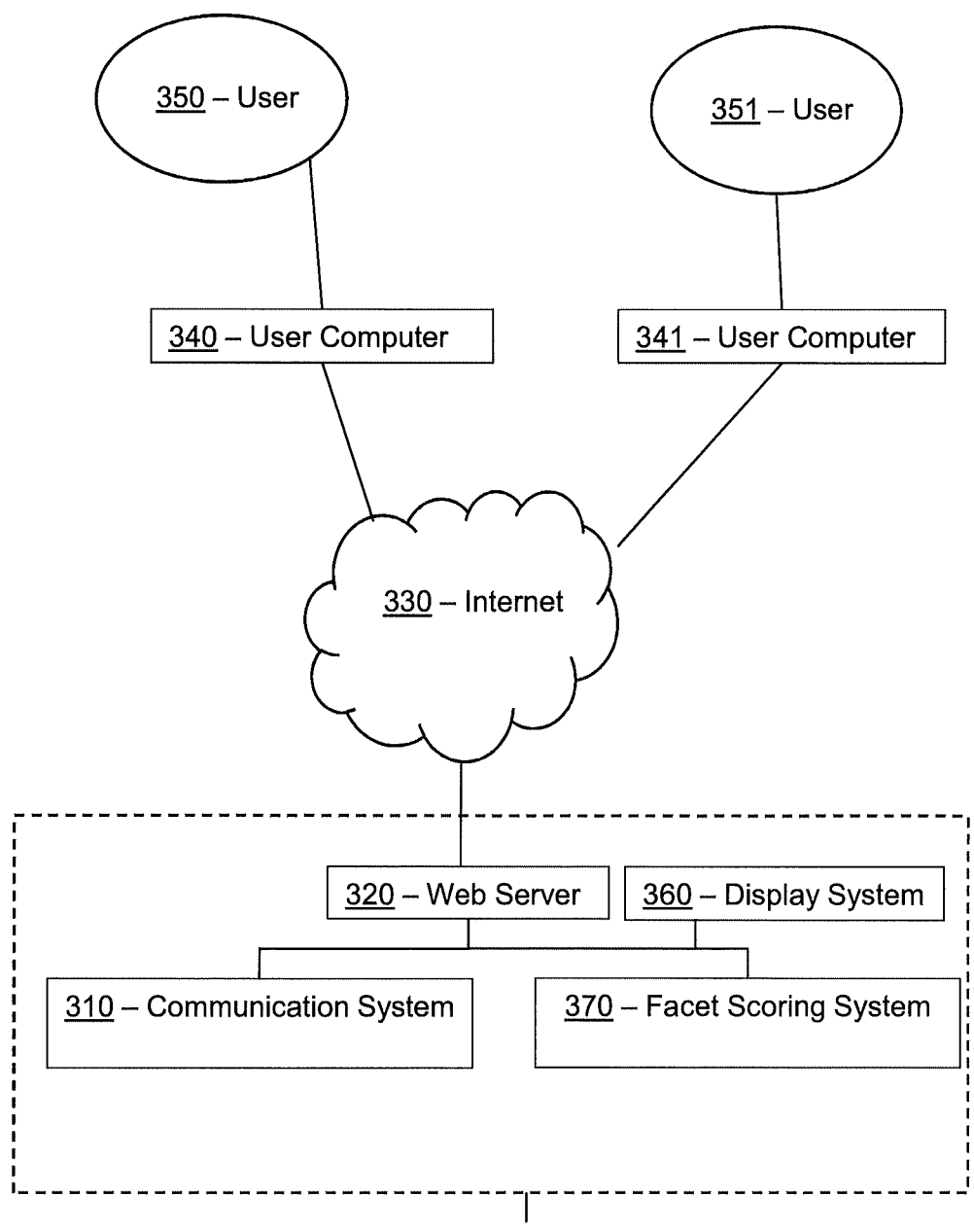
FIG. 3 illustrates a representative block diagram of a system, according to an embodiment.

Turning ahead in the drawings, FIG. 3 illustrates a block diagram of a system 300 that can be employed for determining facet rankings for a website are described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a communication system 310, a web server 320, a display system 360, and a facet scoring system 370. Communication system 310, web server 320, display system 360, and facet scoring system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of communication system 310, web server 320, display system 360, and/or facet scoring system 370. Additional details regarding communication system 310, web server 320, display system 360, and facet scoring system 370 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, communication system 310, web server 320, display system 360, and/or facet scoring system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) communication system 310, web server 320, display system 360, and/or facet scoring system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of communication system 310, web server 320, display system 360, and/or facet scoring system 370. In a similar manner, the processing module(s) and the memory storage module(s) can be local and/or remote to each other.

In many embodiments, communication system 310, web server 320, display system 360, and/or facet scoring system 370 can be configured to communicate with one or more user computers 340 and 341. In some embodiments, user computers 340 and 341 also can be referred to as customer computers. In some embodiments, communication system 310, web server 320, display system 360, and/or facet scoring system 370 can communicate or interface (e.g., interact) with one or more customer computers (such as user computers 340 and 341) through a network or internet 330. Internet 330 can be an intranet that is not open to the public. Accordingly, in many embodiments, communication system 310, web server 320, display system 360, and/or facet scoring system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, communication system 310, web server 320, display system 360, and/or facet scoring system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between communication system 310, web server 320, display system 360, facet scoring system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
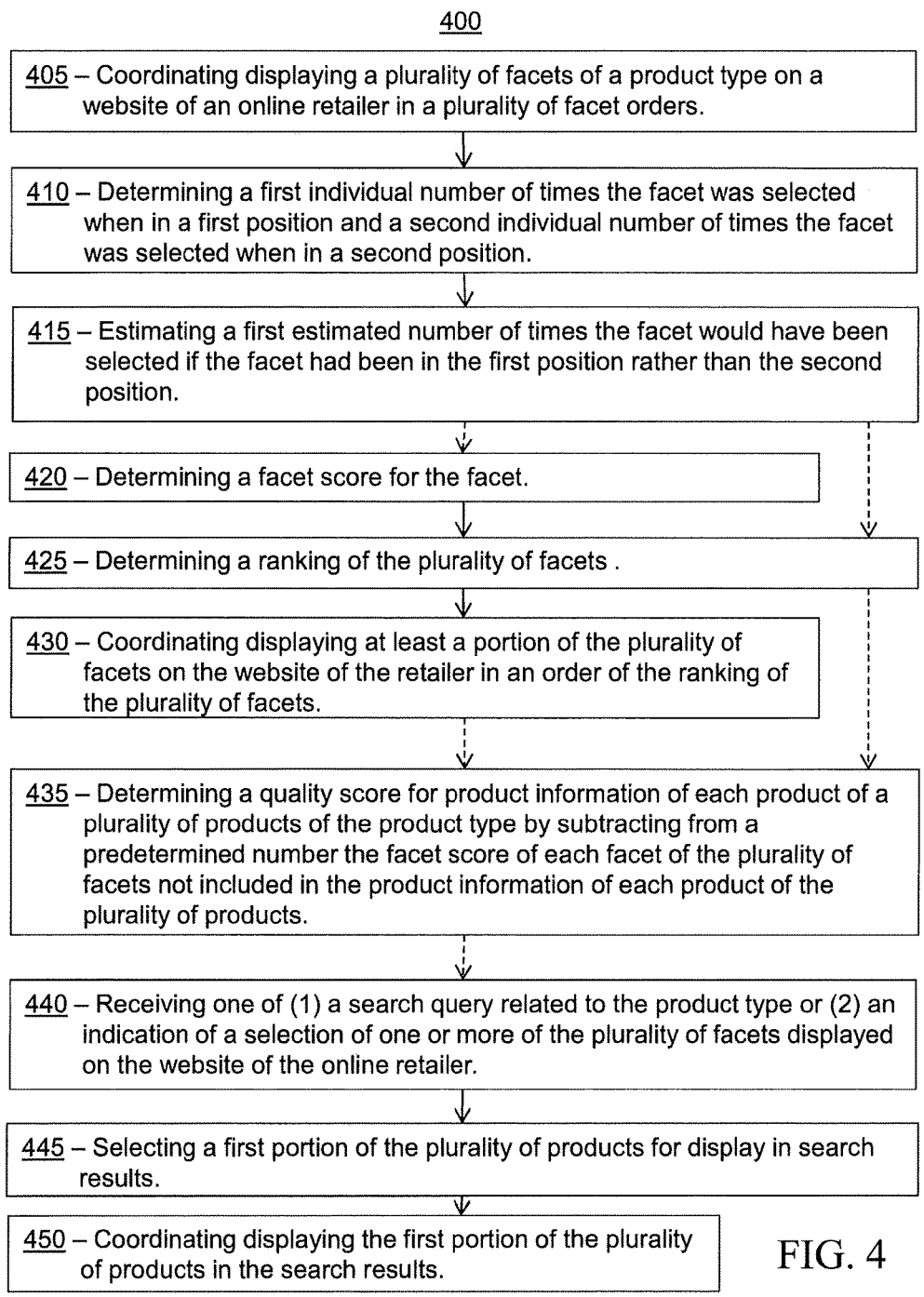
FIG. 4 is a flowchart for a method, according to certain embodiments.
Figure 5:
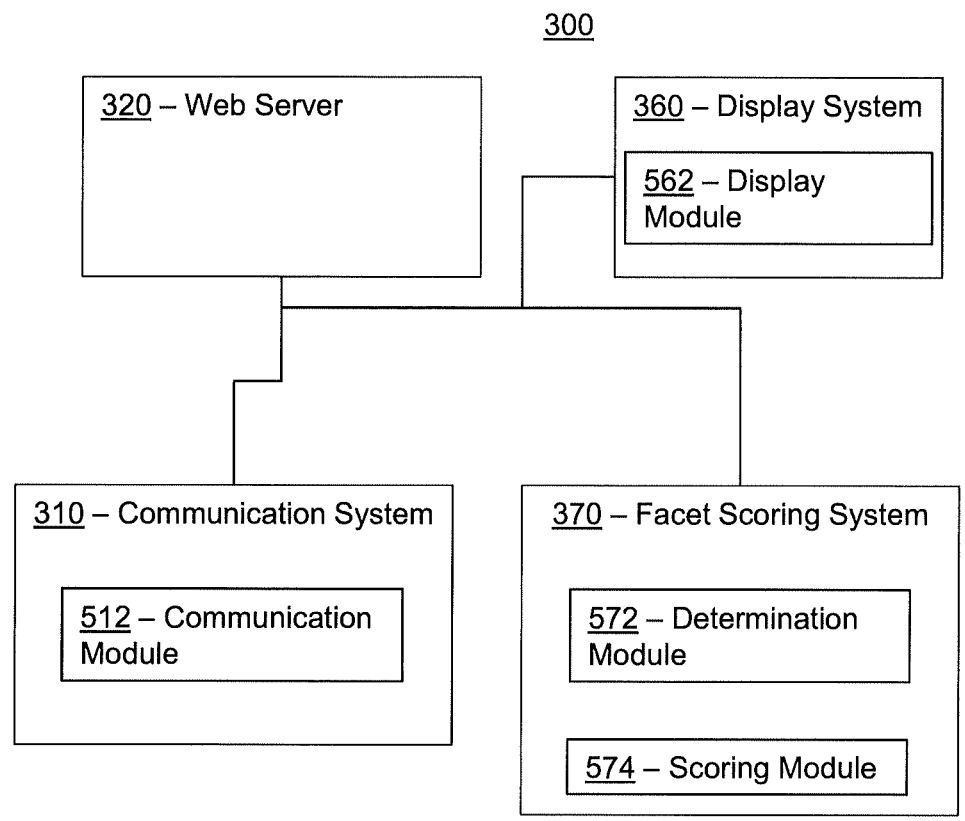
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, 572, and/or 574 (FIG. 5). Such non-transitory memory storage modules can be part of a computer system such as communication system 310, web server 320, display system 360, and/or facet scoring system 370 (FIGS. 3 & 5). The processing module(s) can be similar or identical to the processing module(s) described above with respect to computer system 100 (FIG. 1).

Facets for product attributes of product types are often displayed on websites for online retailers. Facets for the product attributes can be used in faceted navigation or faceted browsing to allow users to explore product types by applying one or more filters. The number of times a particular facet is selected on a website of an online retailer is often used to determine the importance of a corresponding product attribute for a customer. Selection of a particular facet, however, can be highly dependent upon placement of the particular facet on the webpage. For example, facets appearing higher in a list of facets are typically selected more frequently than facets appearing lower in the list of facets. As such, placement of a facet corresponding to less important product attribute at the top of a list of facets can result in an erroneous conclusion that the product attribute is important to customers.

To solve this Internet-centric problem of where to display facets on the website of an online retailer, various embodiments of method 400 and related systems describe determining facet scores of a plurality of facets to determine the importance of each facet, and the corresponding product attribute, to a particular product type. In some embodiments, positional bias in the order of the plurality of facets can be removed using a normalization process that considers each facet as if the facet had occurred in the first position. As described in greater detail below, an empirical approach can be used to boost or estimate impressions and selection of a particular facet of the plurality of facets. In some embodiments, a certain facet corresponding to a certain product attribute for a product type can occur in multiple positions based on the dynamic facet ranking algorithm.

By way of a non-limiting example, Table 1 provides observed click-through-rates (CTR), impressions, and clicks (or selections) at various positions for facets of an entire catalog of products. For example, when any facet of a catalog was displayed in the first position, the CTR for the facet was 0.088043, or 11,666,200 clicks out of 132,505,080 impressions. By comparison, when facet of the catalog was displayed in the second position, the CTR for the facet was 0.036678, or 4,671,470 clicks out of 127,363,023 impressions. As can be seen in Table 1, the CTR for nearly each position is less than the position before it, indicating that the position of the facet can affect the CTR.

TABLE 1

| Position | CTR | Impressions | Clicks |
|---|---|---|---|
| 1 | 0.088043 | 132505080 | 11666200 |
| 2 | 0.036678 | 127363023 | 4671470 |
| 3 | 0.019935 | 116817767 | 2328795 |
| 4 | 0.012594 | 102990633 | 1297112 |
| 5 | 0.009036 | 87911282 | 794375 |
| 6 | 0.006777 | 72907456 | 494130 |
| 7 | 0.005644 | 58312098 | 329140 |
| 8 | 0.004712 | 43580082 | 205331 |
| 9 | 0.004890 | 21908346 | 107136 |
| 10 | 0.002709 | 14183150 | 38420 |
| 11 | 0.001579 | 8926696 | 14094 |
| 12 | 0.000978 | 5126315 | 5011 |
| 13 | 0.000687 | 2683634 | 1843 |

TABLE 1-continued

| Position | CTR | Impressions | Clicks |
|---|---|---|---|
| 14 | 0.000680 | 317643 | 216 |
| 15 | 0.000620 | 116085 | 72 |
| 16 | 0.000572 | 61139 | 35 |
| 17 | 0.000286 | 38477 | 11 |
| 18 | 0.000247 | 24305 | 6 |
| 19 | 0.000000 | 13196 | 0 |
| 20 | 0.000147 | 6816 | 1 |
| 21 | 0.000278 | 3596 | 1 |
| 22 | 0.000000 | 1598 | 0 |
| 23 | 0.000000 | 778 | 0 |
| 24 | 0.000000 | 70 | 0 |
| 25 | 0.000000 | 24 | 0 |
| 26 | 0.000000 | 2 | 0 |
| 27 | 0.000000 | 2 | 0 |

Method 400 can comprise an activity 405 of coordinating displaying of a plurality of facets of a product type on a web site of an online retailer in a plurality of facet orders. Each facet of the plurality of facets can correspond to a product attribute of a plurality of product attributes for the product type. Each facet order of the plurality of facet orders can comprise each of the plurality of facets or only portion of the plurality of facets. In each individual facet order of the plurality of facet orders, the facets displayed in that facet order are in different positions than in other facet orders of the plurality of facet orders. For example, in a first facet order, facet A can be in a first position, facet B can be in a second position, and facet C can be in a third position. Continuing with this non-limiting example, in a second facet order, facet B can be in a first position, facet C can be in a second position, and facet A can be in a third position. Further continuing with this non-limiting example, in a third facet order, facet C can be in a first position, facet D can be in a second position, facet B can be in a third position, and facet A can be entirely absent from the third facet order.

Next, method 400 can comprise an activity of collecting historical data for each facet of the plurality of facets relative to positioning of the facet in the facet order. The historical data can comprise search queries and browsing for products after a search query or independent of a search query. Method 400 also can comprise an activity determining a particular product type based on one or more products selected after searching or browsing. Method 400 also can comprise an activity of determining a number of clicks or selections, impressions, and/or the CTR for all of the facets at each position for a product type irrespective of which facet of the plurality of facets is in each position.

Next, method 400 can comprise an activity of, for each facet of a plurality of facets of a product type, determining selections and impressions of the facet in each position of the plurality of facet orders. For example, method 400 can comprise an activity 410 of determining a first individual number of times the facet was selected when in a first position in the plurality of facet orders, determining a second individual number of times the facet was selected when in a second position in the plurality of facet orders different from the first position, determining a third individual number of times the facet was selected when in a third position in the plurality of facet orders different from the first and second positions, and so on. The first position can be the position at the top of a display of facets, the second position can be the position second from the top of display of facets, and so on.

By way of a non-limiting example, Table 2 is a list of impressions and clicks by position for a facet corresponding to a "brand" product attribute for a "laptop computers"

product type. For example, the facet had 2,478,366 impressions (or was displayed in the first position 2,478,366 times) and was selected 468,857 times.

TABLE 2

| Position | Impressions | Clicks |
|---|---|---|
| 1 | 2478366 | 468857 |
| 3 | 560905 | 81018 |
| 5 | 15299 | 443 |
| 7 | 332 | 18 |
| 2 | 627105 | 92065 |
| 4 | 23618 | 3455 |
| 6 | 1112 | 103 |

In some embodiments, activity 410 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

Next, method 400 can comprise an activity of boosting all the positions (besides the first position) as if the facet had been display at the first position. More particularly, method 400 can comprise an activity 415 of estimating a first estimated number of times the facet would have been selected if the facet had been in the first position rather than the second position. Activity 415 can use (1) a first set of rules, and (2) the second individual number of times the facet was selected when in the second position to estimate the first estimated number of times the facet would have been selected if the facet had been in the first position rather than the second position.

In some embodiments, the first set of rules can comprise (A) multiplying (1) the second number of times the facet was selected when in the second position, and (2) a first overall number of times any facet of the plurality of facets was selected when in the first position to obtain a first multiplication product, and (B) dividing the first multiplication product by a second overall number of times any facet of the plurality of facets was selected when in the second position.

By way of a non-limiting example, Table 3 is a list of impressions, impressions boosted (or estimated) for the first position, clicks, and clicks boosted (or estimated) for the first position by position for the facet corresponding to a brand product attribute for the laptop computers product type provided in Table 2.

TABLE 3

| Position | Impressions | Impressions Boosted for $1^{st}$ Position | Clicks | Clicks Boosted for $1^{st}$ Position |
|---|---|---|---|---|
| 1 | 2478366 | 2478366 | 468857 | 468857 |
| 3 | 560905 | 636228 | 81018 | 405863 |
| 5 | 15299 | 23059 | 443 | 6505 |
| 7 | 332 | 754 | 18 | 638 |
| 2 | 627105 | 652423 | 92065 | 229916 |
| 4 | 23618 | 30386 | 3455 | 31074 |
| 6 | 1112 | 2020 | 103 | 2431 |

For example, when the facet brand was in the second position (position 2), it had 627,105 impressions and 92,065 clicks or selections. Using the first set of rules, a first estimated number of times the brand facet would have been selected if the brand facet had been in the first position rather than the second position can be estimated by multiplying the number of times the brand facet was selected in the second position (92,065, from Table 3) by the overall number times any facet was selected when in the first position (Ser. No. 11/666,200, from Table 1) to obtain the first multiplication product. This first multiplication product then can be divided by the overall number of times any facet of the plurality of facets was selected when in the second position (4,671,470, from Table 1). Thus:

$$\frac{(92,065 * 11,666,200)}{4,671,470} \sim 229,916$$

As also shown in Table 3, in some embodiments, method 400 also can comprise an activity of estimating a number of impressions for a facet in the first position rather than the second position. Estimating a number of impressions for a facet in the first position rather than the second position can, in some embodiments comprise (A) multiplying (1) the number of impression of the facet in the second position, and (2) an overall number of impressions of any facet of the plurality of facets in the first position to obtain an additional multiplication product, and then (B) dividing this additional multiplication product by an overall number of impressions of any facet of the plurality of facets at the second position.

In some embodiments, method 400 next can optionally comprise an activity 420 of determining a facet score for each facet of the plurality of facets. More particularly, the facet score for each facet of the plurality of facet can be determined using (1) a second set of rules, (2) the first individual number of times each facet of the plurality of facets was selected when in the first position, and (3) the first estimated number of times each facet of the plurality of facets would have been selected if each facet of the plurality of facets had been in the first position rather than the second position.

In some embodiments, the second set of rules can first comprise determining a determining a total number of order positions of the plurality of facet orders in which the facet appeared. Returning to the facet brand example, the total number of order positions of the plurality of facet orders in which the facet appeared is 7 (see Table 2). Next, the second set of rules can comprise obtaining an empirical CTR for the facet. The empirical CTR for the facet can be obtained by dividing a sum of the clicks boosted for the first position by a multiplication product of (a) the total number of order positions multiplied by (b) an overall number of impressions of the product type at the first position. In some embodiments, the sum of the clicks boosted for the first position can comprise the sum of (1) the first individual number of times the facet was selected when in the first position and (2) the first estimated number of times the facet would have been selected if the facet had been in the first position rather than the second position (or any other position besides the first position).

Returning to the facet brand example, the empirical CTR for the facet brand can be obtained by dividing a sum of the clicks boosted for the first position (1,145,286, from a sum of the right column of Table 3) by a multiplication product of (a) the total number of order positions (7, from Table 2) multiplied by (b) an overall number of impressions of the product type at the first position (132,505,080, from Table 1). Thus, the empirical CTR for the facet brand is 0.0012347632:

$$(1,145,286)/(7*132,505,080)=0.0012347632$$

In some embodiments, the facet score can be determined by normalizing the empirical CTR for the facet. Once a facet score for each facet for a product type, the total empirical CTR for the product type can be determined by summing together all the empirical CTRs for the plurality of facets for the product type. The empirical CTR for the facet is normalized dividing the empirical CTR for the facet by the total empirical CTR for the product type. The normalized empirical CTR can be the facet score and can indicate a facet importance for a product type. When the empirical CTRs for each facet have been normalized, the combined facet scores for the plurality of facets sums to 1.

Table 4 is a non-limiting example of facet importance or facet scores for a product type obtained using the first set of rules and the second set of rules as described above. Each attribute shown in Table 4 corresponds to a facet.

TABLE 4

| Product Type | Attribute (Facet) | Facet Importance/Score |
|---|---|---|
| Laptop Computers | condition | 0.30814406 |
| Laptop Computers | wireless_capabilities | 0.23140985 |
| Laptop Computers | ram_memory | 0.08567292 |
| Laptop Computers | brand | 0.06277970 |
| Laptop Computers | color | 0.04011954 |
| Laptop Computers | category | 0.03613918 |
| Laptop Computers | processor_brand | 0.03427799 |
| Laptop Computers | operating_system | 0.03193478 |
| Laptop Computers | wireless | 0.03005068 |
| Laptop Computers | processor_speed | 0.02289781 |
| Laptop Computers | display_technology | 0.01846130 |
| Laptop Computers | connector_type | 0.01815530 |
| Laptop Computers | resolution | 0.01538326 |
| Laptop Computers | laptop_computer_type | 0.01469283 |
| Laptop Computers | screen_size | 0.01172880 |
| Laptop Computers | hard_drive_capacity, capacity | 0.01018054 |
| Laptop Computers | portable, type | 0.00847864 |
| Laptop Computers | watts | 0.00611297 |
| Laptop Computers | processor_type | 0.00544969 |
| Laptop Computers | save_big | 0.00508281 |
| Laptop Computers | features | 0.00237943 |
| Laptop Computers | video_game_platform | 0.00024787 |
| Laptop Computers | memory_capacity | 0.00008342 |
| Laptop Computers | assembled_product_length | 0.00005132 |
| Laptop Computers | data_storage | 0.00002597 |
| Laptop Computers | assembled_product_width | 0.00002287 |
| Laptop Computers | desktop_computer_type | 0.00001741 |
| Laptop Computers | model_name | 0.00000390 |

TABLE 4-continued

| Product Type | Attribute (Facet) | Facet Importance/Score |
|---|---|---|
| Laptop Computers | gender | 0.00000377 |
| Laptop Computers | character | 0.00000185 |
| Laptop Computers | age_group, lifestage | 0.00000184 |
| Laptop Computers | age_range | 0.00000182 |
| Laptop Computers | assembled_product_height | 0.00000162 |
| Laptop Computers | material | 0.00000121 |
| Laptop Computers | finish | 0.00000109 |
| Laptop Computers | cell_phone_service_provider | 0.00000092 |
| Laptop Computers | style | 0.00000043 |
| Laptop Computers | fabric_material | 0.00000037 |
| Laptop Computers | compatible_devices | 0.00000020 |

Next, method 400 can comprise an activity 425 of determining a ranking of the plurality of facets. In some embodiments, the ranking of the plurality of facets can be determined using the facet importance as normalized. For example, the facets can be ranked by facet scores, with the facet having the greatest facet score ranked first. The ranking of the plurality of facets can be determined using (1) the second set of rules, (2) the first individual number of times each facet of the plurality of facets was selected when in the first position, and (3) the first estimated number of times each facet of the plurality of facets would have been selected if each facet of the plurality of facets had been in the first position rather than the second position. By way of a non-limiting example, Table 4 provides the ranking of the plurality of facets for a product type of laptop computers.

Next, method 400 can comprise an activity 430 of coordinating displaying of at least a portion of the plurality of facets on the website of the retailer in an order of the ranking of the plurality of facets. More particularly, activity 430 can comprise coordinating displaying a predetermined number of facets ranked highest in the rankings determined in activity 425. For example, the top 5 or the top 10 facets according to the ranking of activity 425 can be coordinated for display. In some embodiments, activity 430 can comprise coordinating displaying facets comprising a facet importance greater than a predetermined number. For example, only facets comprising a facet importance greater than 0.025 can be coordinated for display.

In some embodiments, method 400 can optionally comprise an activity 435 of determining a quality score for product information of each product of a plurality of products of the product type. By way of a non-limiting example, the quality score for the product information can be determined by subtracting from a predetermined number the facet score of each facet of the plurality of facets not included in the product information of each product of the plurality of products. In some embodiments, the quality score for the product information can be determined by subtracting from a predetermined number the facet score of each facet of the plurality of facets not included in the product information of each product of the plurality of products. For example, if the product information for a laptop computer does not include the condition of the laptop computer, 0.308 can be subtracted from 1, resulting in a quality score of 0.692 for the product information for the laptop computer.

In some embodiments, method 400 can optionally comprise an activity of separately determining a facet score for search facets and browse facets using historical data. For example, overall impressions from searching can be 1,487,762,800 and overall clicks from searching can be 40,656,067, resulting in an overall CTR for searching of 0.027326982 (40,656,067/1,487,762,800=0.027326982). Continuing with this example, overall impression from browsing can be 606,931,735 and overall clicks from browsing can be 59,652,934, resulting in an overall CTR for browsing of 0.098286068 (59,652,934/606,931,735=0.098286068).

In many embodiments, search facets can be attributes that were selected by a user or customer as the user was browsing towards viewing a particular product after the user had begun browsing with a search query. In many embodiments, browse facets can be attributes that were selected without a search query to "kick-start" or begin the browsing session or journey. Accordingly browse facets can sometimes overlap with one another or search facets, but also are a distinct set of selected attributes from the search facets because the customer can access the browse facets without entering a search query.

In some embodiments, determining the facet score for the search facets and the browse facets can comprise an activity of determining a search weightage and a browse weightage. Determining the search weightage and the browse weightage can first comprise normalizing the overall CTR for search and browsing. A denominator is determined by summing the overall CTR for searching and the overall CTR for browsing. In the example above, the denominator is (0.027326982+0.098286068)=0.12561305000983. A search weightage can be determined by dividing the overall CTR for searching by the denominator, and the browse weightage can be determined by dividing the overall CTR for browsing by the denominator. In the example above, search weightage is 0.21754890911304 (0.027326982/0.12561305000983=0.21754890911304), and the browse weightage is 0.78245109080871 (0.098286068/0.12561305000983=0.78245109080871).

In some embodiments, activity 435 of determining the quality score for product information of each product of a plurality of products of the product type can comprise using the search weightage and the browse weightage to determine the quality score for the product information. In some embodiments, the quality score of a product can be a weighted-average of the search facets present for the product and the browse facets present for the product. The quality score can be proportional to the search CTR and the browse CTR. For example, if size is weighted 20% for search, then an item missing size would lose (20%*0.21754890911304) of its quality score, and if size is weighted 10% for facets, then the same item also would also be penalized (10%*0.78245109080871).

In some embodiments, method 400 next can optionally comprise an activity 440 of receiving at least one of (1) a search query related to the product type or (2) an indication of a selection of one or more of the plurality of facets displayed on the website of the online retailer. Next, method 400 can optionally comprise an activity 445 of selecting a first portion of the plurality of products for display in search results. The facet score of each product of the first portion of the plurality of products can be higher than the facet score for each product of a second portion of the plurality of products not selected for display in the search results for the search query. Next, method 400 can optionally comprise an activity 450 of coordinating displaying of the first portion of the plurality of products in the search results.

In some embodiments, method 400 also can comprise an activity of displaying, on a user computer 340 (FIG. 3), a user interface on the web site of the online retailer comprising at least one of (1) a search query entry field and (2) the plurality of facets. Method 400 also can comprise an activity of transmitting, by user computer 340 (FIG. 3), the search query entered by the user to the online retailer computer system. Method 400 also can comprise an activity of transmitting, by user computer 340 (FIG. 3), the selection of the one or more of the plurality of facets to the online retailer computer system. Method 400 also can comprise displaying, on user computer 340 (FIG. 3), the first portion of the plurality of products in the search results on the user interface of the web site of the online retailer.

In some embodiments, method 400 can comprise an activity of coordinating displaying a webpage for a product of the plurality of products. The webpage for the product can comprise a highlighted product attribute for a product attribute of the plurality of product attributes for the product. The highlighted product attribute for the product attribute can be associated with a facet of the plurality of facets comprising a highest facet score relative to facet scores associated with other product attributes of the plurality of product attributes for the product.

In some embodiments, method 400 can comprise an activity of indicating a product of the plurality of products requires additional product attribute information in the product information for the product if the quality score for the product information of the product is below a predetermined threshold. Method 400 can further optionally comprise an activity of coordinating displaying an information request webpage for a supplier of an additional product of the product type. The information request webpage can display the plurality of facets as ranked and a facet entry field proximate each facet of the plurality of facets. This allows the supplier to see the most important product attributes first, increasing the likelihood that the supplier will provide information for the most important product attribute(s).

FIG. 5 illustrates a block diagram of a portion of system 300 comprising communication system 310, web server 320, display system 360, and facet scoring system 370, according to the embodiment shown in FIG. 3. Each of communication system 310, web server 320, display system 360, and/or facet scoring system 370 is merely exemplary and not limited to the embodiments presented herein. Each of communication system 310, web server 320, display system 360, and/or facet scoring system 370 can be employed in many different embodiments or examples not specifically depicted or described herein. In some embodiments, certain elements or modules of communication system 310, web server 320, display system 360, and/or facet scoring system 370 can perform various procedures, processes, and/or acts. In other embodiments, the procedures, processes, and/or acts can be performed by other suitable elements or modules.

In many embodiments, communication system 310 can comprise non-transitory memory storage module 512. Memory storage module 512 can be referred to as communication module 512. In many embodiments, communication module 512 can store computing instruction configured to run on one or more processing modules and perform one or more acts of method 400 (FIG. 4) (e.g., activity 440 of receiving one of (1) a search query related to the product type or (2) an indication of a selection of one or more of the plurality of facets displayed on the website of the online retailer (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 405 of coordinating displaying a plurality of facets of a product type on a web site of an online retailer in a plurality of facet orders, activity 430 of coordinating displaying at least a second portion of the plurality of facets on the website of the retailer in an order of the ranking of the plurality of facets, and activity 450 of coordinating displaying the first portion of the plurality of products in the search results (FIG. 4)).

In many embodiments, facet scoring system 370 can comprise non-transitory memory storage module 572. Memory storage module 572 can be referred to as determination module 572. In many embodiments, determination module 572 can store computing instructions configured to run on one or more processing modules and perform one or more acts of method 400 (FIG. 4) (e.g., activity 410 of determining a first individual number of times the facet was selected when in a first position in the plurality of facet orders, and activity 445 of selecting a first portion of the plurality of products for display in search results (FIG. 4)).

In many embodiments, facet scoring system 370 can comprise non-transitory memory storage module 574. Memory storage module 574 can be referred to as scoring module 574. In many embodiments, scoring module 574 can storing computing instructions configured to run on one or more processing modules and perform one or more acts of method 400 (FIG. 4) (e.g., activity 415 of estimating a first estimated number of times the facet would have been selected if the facet had been in the first position rather than the second position, activity 420 of determining a facet score for the facet, activity 425 of determining a ranking for the plurality of facets, and activity 435 of determining a quality score for product information of each product of a plurality of products of the product type by subtracting from a predetermined number the facet score of each facet of the plurality of facets not included in the product information of each product of the plurality of products (FIG. 4)).

Although systems and methods for determining facet rankings for a website have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
an online retailer computer system comprising one or more processing modules and one or more non-transitory storage modules storing computing instructions configured to run on the one or more processing modules and perform acts of:
coordinating displaying a plurality of facets of a product type on a website of an online retailer in a plurality of facet orders, each facet of the plurality of facets comprising a product attribute of a plurality of product attributes for the product type;
for each facet of the plurality of facets:
determining a first individual number of times the facet was selected when in a first position in the plurality of facet orders;
determining a second individual number of times the facet was selected when in a second position in the plurality of facet orders different from the first position; and
estimating a first estimated number of times the facet would have been selected if the facet had been in the first position rather than the second position using (1) a first set of rules and (2) the second individual number of times the facet was selected when in the second position;
determining a ranking of the plurality of facets using (1) a second set of rules, (2) the first individual number of times each facet of the plurality of facets was selected when in the first position, and (3) the first estimated number of times each facet of the plurality of facets would have been selected if each facet of the plurality of facets had been in the first position rather than the second position; and
coordinating displaying at least a portion of the plurality of facets on the website of the online retailer in an order of the ranking of the plurality of facets.

2. The system of claim 1, wherein the one or more non-transitory storage modules storing computing instructions are further configured to run on the one or more processing modules of the online retailer computer system and perform an act of:
for each facet of the plurality of facets:
determining a facet score by normalizing an empirical click-through-rate for the facet.

3. The system of claim 2, wherein the one or more non-transitory storage modules storing computing instructions are further configured to run on the one or more processing modules of the online retailer computer system and perform an act of determining a quality score for product information of each product of a plurality of products of the product type by subtracting from a predetermined number the facet score of each facet of the plurality of facets not included in the product information of each product of the plurality of products.

4. The system of claim 3, wherein the one or more non-transitory storage modules storing computing instructions are further configured to run on the one or more processing modules of the online retailer computer system and perform acts of:
receiving one of (1) a search query related to the product type or (2) an indication of a selection of one or more of the plurality of facets displayed on the website of the online retailer;
selecting a first portion of the plurality of products for display in search results, wherein the facet score of each product of the first portion of the plurality of products is higher than the facet score for each product of a second portion of the plurality of products not selected for display in the search results for the search query; and
coordinating displaying the first portion of the plurality of products in the search results.

5. The system of claim 4, further comprising a user computer system comprising one or more processing modules and one or more non-transitory storage modules storing computing instructions configured to run on the one or more processing modules of the user computer system and perform acts of:
displaying a user interface on the website of the online retailer comprising at least one of (1) a search query entry field and (2) the plurality of facets;
transmitting the search query entered by a user to the online retailer computer system;
transmitting the selection of the one or more of the plurality of facets to the online retailer computer system; and
displaying the first portion of the plurality of products in the search results on the user interface of the website of the online retailer.

6. The system of claim 3, wherein the one or more non-transitory storage modules storing computing instructions are further configured to run on the one or more processing modules of the online retailer computer system and perform an act of coordinating displaying a webpage for a product of the plurality of products, the webpage comprising a highlighted product attribute for a product attribute of the plurality of product attributes for the product, the highlighted product attribute for the product attribute being associated with a facet of the plurality of facets comprising a highest facet score relative to facet scores associated with other product attributes of the plurality of product attributes for the product.

7. The system of claim 3, wherein the one or more non-transitory storage modules storing computing instructions are further configured to run on the one or more processing modules of the online retailer computer system and perform acts of:
indicating a product of the plurality of products requires additional product attribute information in the product information for the product if the quality score for the product information of the product is below a predetermined threshold; and
coordinating displaying an information request webpage for a supplier of an additional product of the product type, the information request webpage comprising the plurality of facets as ranked and a facet entry field proximate each facet of the plurality of facets.

8. The system of claim 1, wherein the first set of rules comprises:
multiplying (1) the second individual number of times the facet was selected when in the second position, and (2) a first overall number of times any facet of the plurality of facets was selected when in the first position to obtain a first multiplication product; and
dividing the first multiplication product by a second overall number of times any facet of the plurality of facets was selected when in the second position.

9. The system of claim 8, wherein the second set of rules comprises:
determining a total number of order positions of the plurality of facet orders in which the facet appeared; and
obtaining an empirical click-through-rate for the facet by dividing a sum of (1) the first individual number of times and (2) the first estimated number of times, by a second multiplication product of (a) the total number of order positions multiplied by (b) an overall number of impressions of the product type at the first position.

10. The system of claim 1, wherein:
the first set of rules comprises:
multiplying (1) the second individual number of times the facet was selected when in the second position, and (2) a first overall number of times any facet of the plurality of facets was selected when in the first position to obtain a first multiplication product; and
dividing the first multiplication product by a second overall number of times any facet of the plurality of facets was selected when in the second position;
the second set of rules comprises:
determining a total number of order positions of the plurality of facet orders in which the facet appeared; and
obtaining an empirical click-through-rate for the facet by dividing a sum of (1) the first individual number of times and (2) the first estimated number of times, by a second multiplication product of (a) the total number of order positions multiplied by (b) an overall number of impressions of the product type at the first position;
the one or more non-transitory storage modules storing computing instructions are further configured to run on the one or more processing modules of the online retailer computer system and perform acts of:
for each facet of the plurality of facets:
determining a facet score by normalizing the empirical click-through-rate for the facet;
determining a quality score for product information of each product of a plurality of products of the product type by subtracting from a predetermined number the facet score of each facet of the plurality of facets not included in the product information of each product of the plurality of products;
receiving one of (1) a search query related to the product type or (2) an indication of a selection of one or more of the plurality of facets displayed on the website of the online retailer;
selecting a first portion of the plurality of products for display in search results, wherein the facet score of each product of the first portion of the plurality of products is higher than the facet score for each product of a second portion of the plurality of products not selected for display in the search results for the search query;

coordinating displaying the first portion of the plurality of products in the search results;

coordinating displaying a webpage for a product of the plurality of products, the webpage comprising a highlighted product attribute for a product attribute of the plurality of product attributes for the product, the highlighted product attribute for the product attribute being associated with a facet of the plurality of facets comprising a highest facet score relative to facet scores associated with other product attributes of the plurality of product attributes for the product;

indicating the product of the plurality of products requires additional product attribute information in the product information for the product if the quality score for the product information of the product is below a predetermined threshold; and coordinating displaying an information request webpage for a supplier of an additional product of the product type, the information request webpage comprising the plurality of facets as ranked and a facet entry field proximate each facet of the plurality of facets; and the system further comprises a user computer system comprising one or more processing modules and one or more non-transitory storage modules storing computing instructions configured to run on the one or more processing modules of the user computer system and perform acts of:

displaying a user interface on the website of the online retailer comprising at least one of (1) a search query entry field and (2) the plurality of facets;

transmitting the search query entered by a user to the online retailer computer system;

transmitting the selection of the one or more of the plurality of facets to the online retailer computer system; and displaying the first portion of the plurality of products in the search results on the user interface of the web site of the online retailer.

11. A method comprising:

coordinating, by an online retailer computer system, displaying a plurality of facets of a product type on a web site of an online retailer in a plurality of facet orders, each facet of the plurality of facets comprising a product attribute of a plurality of product attributes for the product type;

for each facet of the plurality of facets:
determining, by the online retailer computer system, a first individual number of times the facet was selected when in a first position in the plurality of facet orders;

determining, by the online retailer computer system, a second individual number of times the facet was selected when in a second position in the plurality of facet orders different from the first position; and estimating, by the online retailer computer system, a first estimated number of times the facet would have been selected if the facet had been in the first position rather than the second position using (1) a first set of rules and (2) the second individual number of times the facet was selected when in the second position;

determining, by the online retailer computer system, a ranking of the plurality of facets using (1) a second set of rules, (2) the first individual number of times each facet of the plurality of facets was selected when in the first position, and (3) the first estimated number of times each facet of the plurality of facets would have been selected if each facet of the plurality of facets had been in the first position rather than the second position; and coordinating, by the online retailer computer system, displaying at least a portion of the plurality of facets on the website of the online retailer in an order of the ranking of the plurality of facets.

12. The method of claim 11, further comprising for each facet of the plurality of facets:
determining, by the online retailer computer system, a facet score by normalizing an empirical click-through-rate for the facet.

13. The method of claim 12, further comprising determining, by the online retailer computer system, a quality score for product information of each product of a plurality of products of the product type by subtracting from a predetermined number the facet score of each facet of the plurality of facets not included in the product information of each product of the plurality of products.

14. The method of claim 13, further comprising:
receiving, by the online retailer computer system, one of (1) a search query related to the product type or (2) an indication of a selection of one or more of the plurality of facets displayed on the website of the online retailer;

selecting, by the online retailer computer system, a first portion of the plurality of products for display in search results, wherein the facet score of each product of the first portion of the plurality of products is higher than the facet score for each product of a second portion of the plurality of products not selected for display in the search results for the search query; and coordinating, by the online retailer computer system, displaying the first portion of the plurality of products in the search results.

15. The method of claim 14, further comprising:
displaying, by a user computer system, a user interface on the website of the online retailer comprising at least one of (1) a search query entry field and (2) the plurality of facets;

transmitting, by the user computer system, the search query entered by a user to the online retailer computer system;

transmitting, by the user computer system, the selection of the one or more of the plurality of facets to the online retailer computer system; and displaying, by the user computer system, the first portion of the plurality of products in the search results on the user interface of the website of the online retailer.

16. The method of claim 13, further comprising coordinating, by the online retailer computer system, displaying of a webpage for a product of the plurality of products, the webpage comprising a highlighted product attribute for a product attribute of the plurality of product attributes for the product, the highlighted product attribute for the product attribute being associated with a facet of the plurality of facets comprising a highest facet score relative to facet scores associated with other product attributes of the plurality of product attributes for the product.

17. The method of claim 13, further comprising:
indicating, by the online retailer computer system, a product of the plurality of products requires additional product attribute information in the product information for the product if the quality score for the product information of the product is below a predetermined threshold; and coordinating, by the online retailer computer system, displaying an information request webpage for a supplier of an additional product of the product type, the information request webpage comprising the plurality of facets as ranked and a facet entry field proximate each facet of the plurality of facets.

18. The method of claim 11, wherein the first set of rules comprises:
multiplying (1) the second individual number of times the facet was selected when in the second position, and (2) a first overall number of times any facet of the plurality of facets was selected when in the first position to obtain a first multiplication product; and
dividing the first multiplication product by a second overall number of times any facet of the plurality of facets was selected when in the second position.

19. The method of claim 18, wherein the second set of rules comprises:
determining a total number of order positions of the plurality of facet orders in which the facet appeared; and
obtaining an empirical click-through-rate for the facet by dividing a sum of (1) the first individual number of times and (2) the first estimated number of times, by a second multiplication product of (a) the total number of order positions multiplied by (b) an overall number of impressions of the product type at the first position.

20. The method of claim 11, wherein:
the first set of rules comprises:
multiplying (1) the second individual number of times the facet was selected when in the second position, and (2) a first overall number of times any facet of the plurality of facets was selected when in the first position to obtain a first multiplication product; and
dividing the first multiplication product by a second overall number of times any facet of the plurality of facets was selected when in the second position;
the second set of rules comprises:
determining a total number of order positions of the plurality of facet orders in which the facet appeared; and
obtaining an empirical click-through-rate for the facet by dividing a sum of (1) the first individual number of times and (2) the first estimated number of times, by a second multiplication product of (a) the total number of order positions multiplied by (b) an overall number of impressions of the product type at the first position; and
the method further comprises:
for each facet of the plurality of facets determining, by the online retailer computer system, a facet score by normalizing the empirical click-through-rate for the facet;
determining, by the online retailer computer system, a quality score for product information of each product of a plurality of products of the product type by subtracting from a predetermined number the facet score of each facet of the plurality of facets not included in the product information of each product of the plurality of products;
receiving, by the online retailer computer system, one of (1) a search query related to the product type or (2) an indication of a selection of one or more of the plurality of facets displayed on the web site of the online retailer;
selecting, by the online retailer computer system, a first portion of the plurality of products for display in search results, wherein the facet score of each product of the first portion of the plurality of products is higher than the facet score for each product of a second portion of the plurality of products not selected for display in the search results for the search query;
coordinating, by the online retailer computer system, displaying the first portion of the plurality of products in the search results;
coordinating, by the online retailer computer system, displaying a webpage for a product of the plurality of products, the webpage comprising a highlighted product attribute for a product attribute of the plurality of product attributes for the product, the highlighted product attribute for the product attribute being associated with a facet of the plurality of facets comprising a highest facet score relative to facet scores associated with other product attributes of the plurality of product attributes for the product;
indicating, by the online retailer computer system, the product of the plurality of products requires additional product attribute information in the product information for the product if the quality score for the product information of the product is below a predetermined threshold;
coordinating, by the online retailer computer system, displaying an information request webpage for a supplier of an additional product of the product type, the information request webpage comprising the plurality of facets as ranked and a facet entry field proximate each facet of the plurality of facets;
displaying, by a user computer system, a user interface on the website of the online retailer comprising at least one of (1) a search query entry field and (2) the plurality of facets;
transmitting, by the user computer system, the search query entered by a user to the online retailer computer system;
transmitting, by the user computer system, the selection of the one or more of the plurality of facets to the online retailer computer system; and
displaying, by the user computer system, the first portion of the plurality of products in the search results on the user interface of the website of the online retailer.

* * * * *